US005235864A

United States Patent [19]

Rosselli et al.

[11] Patent Number: 5,235,864

[45] Date of Patent: Aug. 17, 1993

[54] CENTRIFUGE ROTOR IDENTIFICATION SYSTEM BASED ON ROTOR VELOCITY

[75] Inventors: Richard A. Rosselli, Trumbull; Oakley L. Weyant, Jr., Southbury, both of Conn.

[73] Assignee: E. I. du Pont de Nemours and Company, Wilmington, Del.

[21] Appl. No.: 631,438

[22] Filed: Dec. 21, 1990

[51] Int. Cl.$^5$ .......... G01M 19/00

[52] U.S. Cl. .......... 73/865.9; 73/507; 494/1; 494/10

[58] Field of Search .......... 73/865.9, 509, 514, 73/507, 517 A; 366/142; 494/1, 7-11, 37, 84, 85

[56] References Cited

U.S. PATENT DOCUMENTS

| | | | |
|---|---|---|---|
| 3,101,322 | 8/1963 | Stallman et al. | 494/9 |
| 3,262,040 | 7/1966 | Jackson et al. | 318/327 |
| 3,436,637 | 4/1969 | Ehret | 318/449 |
| 3,636,545 | 1/1972 | Boyd et al. | 364/565 |
| 3,746,247 | 7/1973 | Camillere | 494/9 |
| 3,836,833 | 9/1974 | Harris et al. | 318/270 |
| 3,921,047 | 11/1975 | Carter et al. | 318/313 |
| 3,961,745 | 6/1976 | Wright | 494/9 |
| 3,970,245 | 7/1976 | Aeschlimann | 494/9 |
| 3,982,162 | 9/1976 | Olliffe | 318/313 |
| 3,990,633 | 11/1976 | Stahl et al. | 494/9 |
| 4,096,422 | 6/1978 | Fleming et al. | 318/314 |
| 4,142,138 | 2/1979 | Taylor et al. | 318/542 |
| 4,201,335 | 5/1980 | Conn et al. | 494/9 |
| 4,205,261 | 5/1980 | Franklin | 318/480 |
| 4,284,931 | 8/1981 | Ehret | 318/318 |
| 4,390,825 | 6/1983 | Ginn | 318/384 |
| 4,415,844 | 11/1983 | Mendenhall et al. | 318/254 |
| 4,450,391 | 5/1984 | Hara | 318/313 |
| 4,551,715 | 11/1985 | Durbin | 340/671 |
| 4,564,795 | 1/1986 | Parkes et al. | 318/314 |
| 4,580,084 | 4/1986 | Takahashi et al. | 318/396 |
| 4,601,696 | 7/1986 | Kamm | 494/10 |
| 4,700,117 | 10/1987 | Giebler et al. | 318/327 |
| 4,753,631 | 6/1988 | Romanauskas | 494/9 |
| 4,772,254 | 9/1988 | Grassl et al. | 494/10 |
| 4,827,196 | 5/1989 | Odell | 318/254 |
| 4,827,197 | 5/1989 | Giebler | 318/3 |
| 4,857,811 | 8/1989 | Barrett et al. | 474/10 X |
| 4,903,191 | 2/1990 | Fries | 364/132 |

FOREIGN PATENT DOCUMENTS

| | | | |
|---|---|---|---|
| 1063532 | 8/1959 | Fed. Rep. of Germany | 494/10 |
| 3840295 | 11/1988 | Fed. Rep. of Germany . | |
| 4201 | 6/1988 | PCT Int'l Appl. . | |
| 7666651 | 2/1978 | U.S.S.R. . | |
| 2126358 | 7/1983 | United Kingdom . | |

OTHER PUBLICATIONS

Modeling, Simulation and Control, 1987, 10,1, pp. 26-32, Mukhopadhyay, A. K.; Gosh, F.; Das., N.C. "Microprocessor Based Optimum Speed Measurement and the Protection Against Overspeed".

*Primary Examiner*—Tom Noland

[57] ABSTRACT

A rotor identification system uses the windage of a rotor to produce a signal representative of rotor identity. For a low windage rotor the actual velocity at a predetermined measurement time is used to generate the rotor identity signal. For a high windage rotor the time needed to reach a predetermined measurement velocity is used to generate the rotor identity signal. A selector determines initially whether the rotor is within the low windage or the high windage regime.

49 Claims, 2 Drawing Sheets

CENTRIFUGE ROTOR IDENTIFICATION SYSTEM BASED ON ROTOR VELOCITY

BACKGROUND OF THE INVENTION

1. Field of the Invention

The present invention relates to a centrifuge instrument having a system for automatically identifying a rotor introduced thereinto.

2. Description of the Prior Art

A centrifuge instrument is a device adapted to expose a liquid sample carried in a rotating member, called a rotor, to a centrifugal force field. The centrifuge instrument includes a drive shaft, or spindle, adapted to receive any one of a predetermined plurality of rotors. It is important to correctly ascertain the identity of a particular rotor being used in the instrument at any given time. Such rotor identity information is important, among other reasons, for automatically controlling acceleration and deceleration times and for controlling the temperature or other parameters related to the particular separation being effected. Perhaps more importantly rotor identification is vital to insure that the particular rotor being used is not rotated to a speed that would cause rotor disintegration at an energy level high enough to breach the containment system of the instrument.

Presently rotor identification may be performed manually be requiring the operator of the instrument to introduce information via the control panel regarding the identity of the particular rotor being utilized. This system is open to inadvertent error or deliberate misrepresentation by the operator and thus cannot be relied upon for providing rotor identification information if the same is being used in connection with any safety-related consideration.

Automatic systems for rotor identification are available. Exemplary of such systems are those shown in U.S. Pat. No. 4,551,715 (Durbin) and U.S. Pat. No. 4,601,696 (Kamm). These systems utilize some form of coding elements usually disposed on the undersurface of the rotor. The coding elements are read by an appropriate optical or magnetic detector mounted in an operative location in the instrument. These systems share the disadvantage that the detector element, due to its location within the instrument, may be subject to corrosion which would vitiate its ability to accurately detect the coding elements provided on the rotor. Moreover such a system would be inapplicable in ascertaining the identity of rotors not equipped with the appropriate coding elements. Thus these identification systems would be unable to identify a significant population of rotors unless those rotors were retrofit with the appropriate coding elements. Furthermore retrofitting carries with it the risk of accidental or deliberate mismarking of the rotor and for this reason shares the same disadvantages as discussed above.

A rotor identification system relying on the interruption of a beam of light from a source to a detector is disclosed in U.S. Pat. No. 4,450,391 (Hara).

U.S. Pat. No. 4,827,197 (Giebeler) discloses a rotor identification system based on the inertia of the rotor when the rotor is used in what is believed to be an evacuated chamber. Such a system may be applicable for use in a nonevacuated or partially evacuated chamber so long as the inertia measurement is made at an angular velocity which is sufficiently low so that windage effects are negligible. This system would appear to become unreliable when windage effects become dominant.

An ultrasonic rotor recognition system is disclosed and claimed in copending application Ser. No. 07/363,907, filed May 18, 1989, and now U.S. Pat. No. 5,037,371 based on international application PCT/US87/03221 (Romanauskas), and now International Publication No. W088/0420, assigned to the assignee of the present invention.

SUMMARY OF THE INVENTION

The present invention relates to an apparatus and to a method for identifying which one of a plurality of rotors is mounted within a centrifuge instrument. Each rotor has a predetermined velocity versus time profile associated therewith. The instrument includes a motive source having a shaft adapted to receive one of a plurality of rotors thereon.

In accordance with a first embodiment of the invention, one or more signal(s) is(are) generated representative of the actual velocity $\omega_a$ of a rotor disposed on the shaft at one or more measurement times $t_m$ following initiation of rotation of the rotor. The predetermined measurement times $t_m$ is(are) selected such that windage effects imposed on the rotor cause the velocity of the rotor on the shaft to differ by a measurable amount from the velocity of each of the others of the plurality of rotors. A rotor identity signal based upon the windage of the rotor is generated in response to the signal(s) representative of the velocity $\omega_a$. The rotor identity signal may be generated using a look-up table or a comparator for comparing the actual velocity signal $\omega_a$ to a velocity reference signal $\omega_{ref}$. The velocity reference signal $\omega_{ref}$ may be derived from a first rotor identification system.

In accordance with a second embodiment of the invention one or more signal(s) is(are) generated representative of the time $t_a$ that a rotor disposed on the shaft first reaches one or more predetermined measurement velocities $\omega_m$. The predetermined measurement velocity $\omega_m$ is(are) selected so that windage effects imposed on the rotor cause the time(s) required by the rotor on the shaft to reach the measurement velocity differ by a measurable amount from the time required by each of the others of the plurality of rotors to reach the measurement velocity $\omega_m$. A rotor identity signal based upon the windage of the rotor is generated in response the signal(s) representative of the time $t_a$. The rotor identity signal may be generated using a look-up table or a comparator for comparing the time signal $t_a$ to a time reference signal $t_{ref}$. The time reference signal $t_{ref}$ may be derived from a first rotor identification system.

In accordance with a third embodiment of the present invention a selector for selectively applying either the velocity signal $\omega_a$ or the time signal $t_a$ to the rotor identity signal generator. The selector applies the selected signal in accordance with the relationship between the actual velocity of the rotor as measured at a predetermined time $t_d$ with respect to a predetermined velocity $\omega_d$.

BRIEF DESCRIPTION OF THE DRAWINGS

The invention may be more fully understood from the following detailed description thereof, taken in connection with the accompanying drawings, which form a part of this application and in which.

Figure 1:
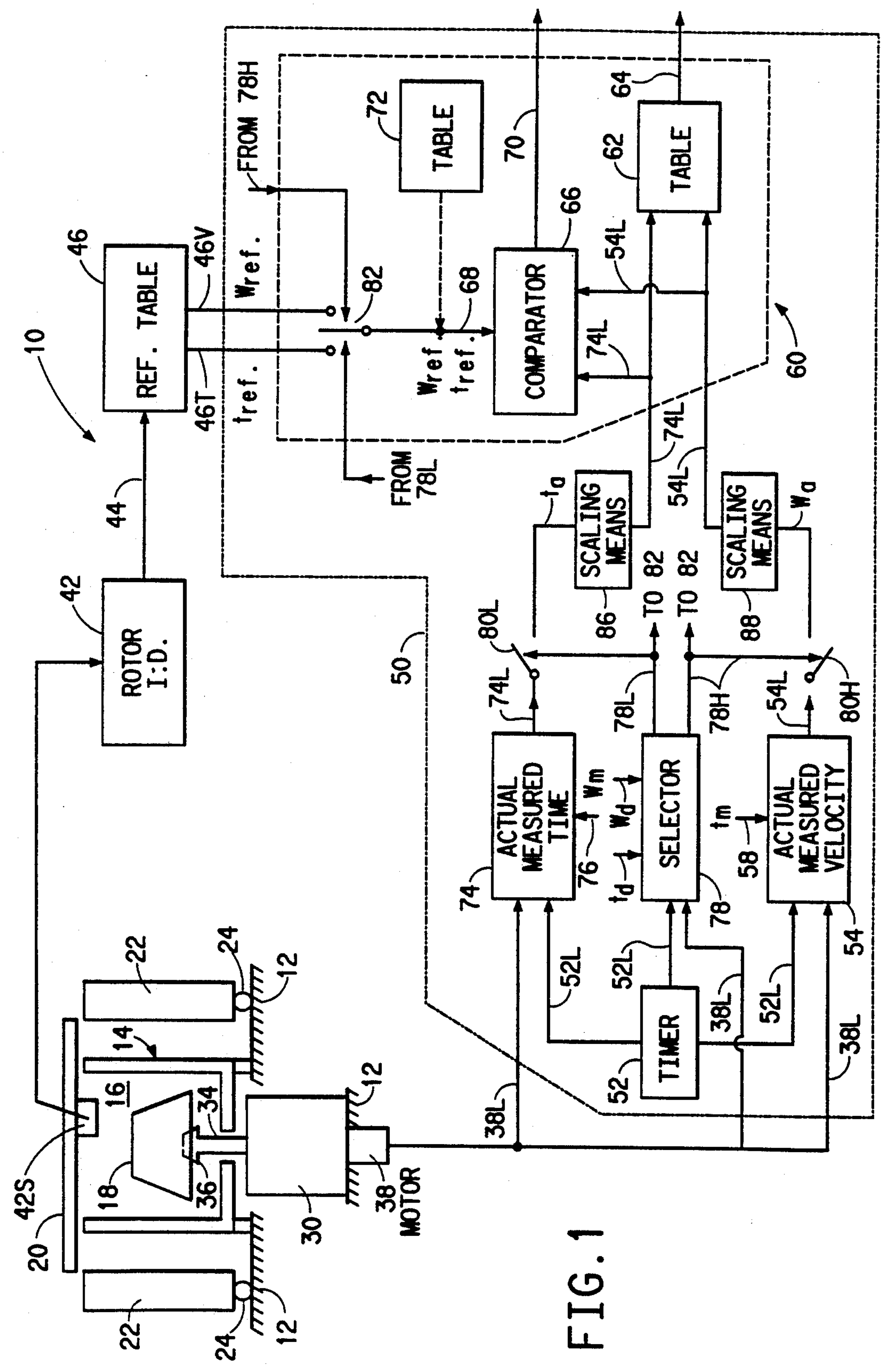
FIG. 1 is a highly stylized pictorial representation of a centrifuge instrument with which a control system in accordance with the present invention may be used, and includes a functional block diagram of the control system of the present invention.

The Appendix (two pages) attached hereto following the description and preceding the claims is a C language source code listing of a program for implementing the present invention.

DETAILED DESCRIPTION OF THE INVENTION

Throughout the following detailed description, similar reference numerals refer to similar elements in all Figures of the drawings.

Shown in FIG. 1 is a stylized pictorial representation of a centrifuge instrument generally indicated by reference character 10 with which a rotor identification arrangement generally indicated by the reference character 50 embodying the teachings of the present invention may be used. The instrument 10 includes a framework schematically indicated at 12. The framework 12 supports a bowl 14. The interior of the bowl 14 defines a generally enclosed chamber 16 in which a rotating element, or rotor, 18 may be received. Access to the chamber 16 is afforded through a door 20. The bowl 14 may be provided with suitable evaporator coils (not shown) in the event that it is desired to refrigerate the bowl 14, the rotor 18 and its contents.

One or more energy containment members, or guard rings, 22 is(are) carried by the framework 12. The guard ring 22 is arranged concentrically with respect to the bowl 14 and serves to absorb the kinetic energy of the rotor 18 or fragments thereof should a catastrophic failure of the rotor 18 occur. The guard ring 22 is movably mounted within the framework 12, as schematically indicated by the rollers 24, to permit free rotation of the ring 22 to absorb any rotational component of the energy of the rotor fragments. It is important to absorb the energy of the rotor and to contain the possible fragments which if permitted to exit the instrument may cause injury to an operator.

A motive source 30 is mounted within the framework 12. The motive source 30 may be any one of a well-known variety of sources, such a brushless DC electric motor, an induction motor, or an oil turbine drive. The motive source 30 is connected to or includes as an element thereof a drive shaft 34. The drive shaft 34 projects into the chamber 16. The upper end of the shaft 34 is provided with a mounting spud 36 which receives the rotor 18. Any one of a predetermined number of rotor elements may be received on the spud 36.

Whatever form is used the source 30 exhibits a predetermined output torque versus angular velocity profile. When asserted the source 30 is operative to accelerate a rotor 18 mounted on the shaft 34 to a predetermined operational angular velocity. A tachometer generally indicated by the reference character 38 is arranged to monitor the rotational speed (i.e., angular velocity) of the shaft 34 and thereby the rotational speed (i.e., angular velocity) of the rotor 18 received thereon. Any convenient form of tachometer arrangement may be utilized and remain within the contemplation of the present invention. An electrical signal representative of the actual angular velocity of the shaft 34 and of a rotor mounted thereon is carried by an output line 38L from the tachometer 38.

As mentioned earlier it is vitally important to accurately identify the rotor 18 mounted to the shaft 34. To this end the instrument 10 may include a first rotor identification system 42. The first rotor identification system 42 includes a sensor 42S disposed within the chamber 16. The system 42 is operative to provide an identification signal on a line 44 representative of the identity of the particular rotor 18 mounted within the chamber 16. The ultrasonic rotor recognition system disclosed and claimed in copending application Ser. No. 07/363,907, assigned to the assignee of the present invention, is preferred.

For reasons that will become more apparent herein the identification signal produced by the first rotor identification system 42 on the line 44 is utilized as an entry into a suitable reference table 46. Output lines 46V, 46T extend from the reference table 46. The signal on the line 46V represents the angular velocity $\omega_{ref}$able to be achieved by the particular rotor as identified by the first rotor identification system 42 within a predetermined time following the initiation of a centrifugation run. Similarly, the signal on the line 46T represents the time $t_{ref}$required following the initiation of a centrifugation run for the particular rotor identified by the first rotor identification system 42 to achieve a predetermined angular velocity.

When a motive force is applied a body disposed in a nonevacuated or a partially evacuated environment, such as a rotor 18 mounted to the shaft 34 within the chamber 16, the body manifests two forms of resistance to motion in response to the application of the motive force. The first form of resistance is functionally related to the mass of the body and to its radially distribution. This form of resistance is termed inertia. Inertial resistance to acceleration is dominant in a nonevacuated or a partially evacuated environment at relatively low rotational speeds. The second form of resistance to motion is a fluid frictional effect functionally related to the configuration of the body. This effect is termed windage. Windage is dominant in a nonevacuated or a partially evacuated environment at relatively high rotational speeds.

Figure 2:
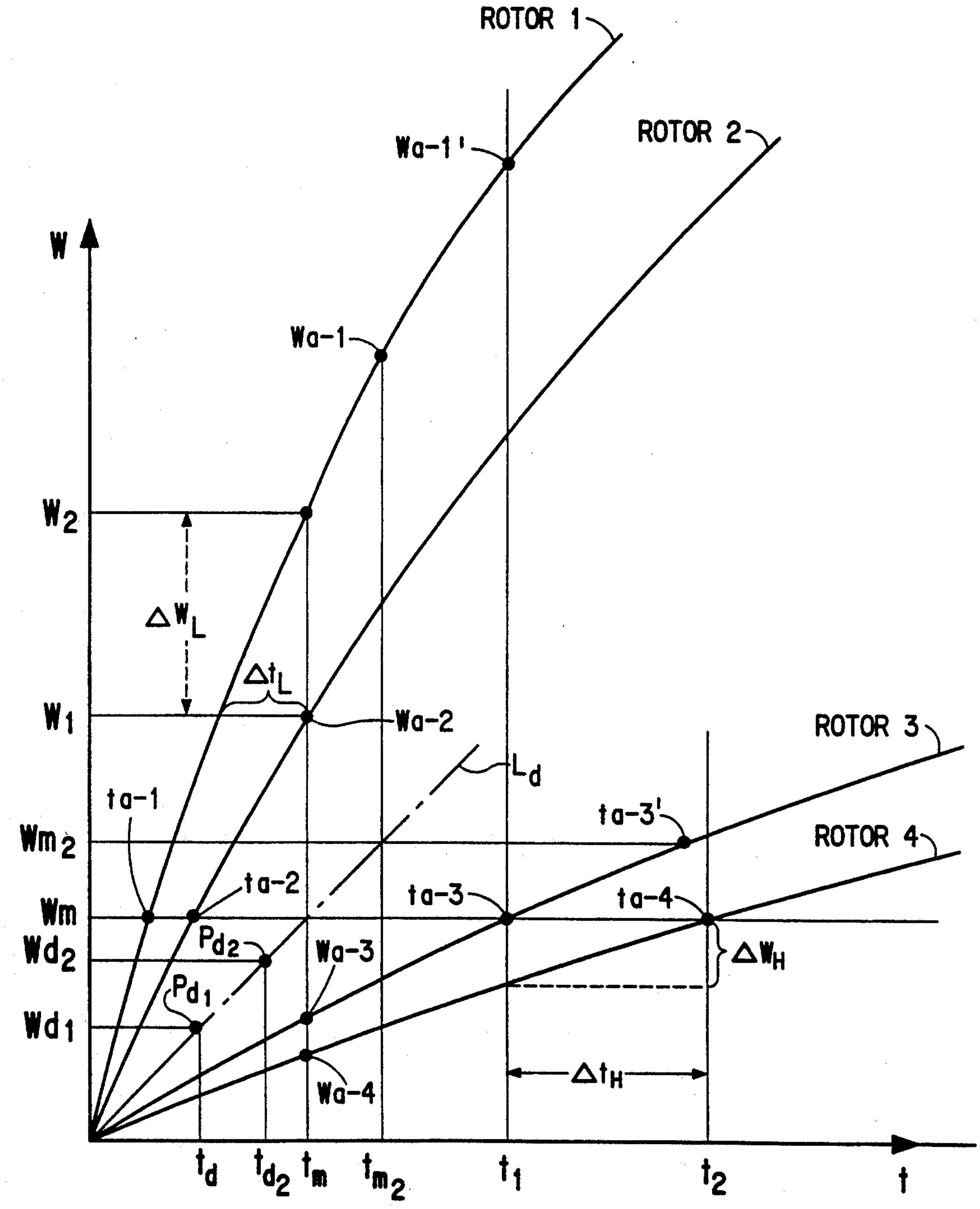
FIG. 2 is a graph of the relationship between rotor speed and time for a hypothetical family of centrifuge rotors.

With reference to FIG. 2 shown is a graphical depiction of the angular velocity $\omega$ versus time t for a family of four centrifuge rotors. Rotors 1 and 2 are regarded as low windage rotors, while rotors 3 and 4 may be viewed as high windage rotors. The windage of rotor 1 is less than that of rotor 2. Similarly the windage of rotor 3 is less than that of rotor 4. Every centrifuge rotor usable within a given centrifuge instrument exhibits a predetermined angular velocity versus time profile such as is indicated in FIG. 2.

As may be viewed from inspection of FIG. 2 a low windage rotor such as rotor 1 (or rotor 2) undergoes a relatively substantial increase in angular velocity $\Delta\omega_L$ for a relatively small time increment $\Delta t_L$. Conversely, a high windage rotor such as rotor 4 (or rotor 3) undergoes a relatively small increase in angular velocity $\Delta\omega_H$ over a relatively substantial time increment $\Delta t_H$.

Thus, there may be defined a demarcating curve, shown in FIG. 2 as a line $L_d$, which may be used to separate rotors that exhibit low windage effects from those that exhibit high windage effects. This circumstance is utilized in one aspect of the present invention, as will be described presently. For later reference there is defined a first predetermined decision point $P_d$ along the curve of demarcation $L_d$. The point decision $P_d$ is defined by the decision time $t_d$ and the decision velocity $\omega_d$. The point $P_d$ thus has the coordinates $(t_d, \omega_d)$. A second predetermined point $P_{d2}$ along the curve of demarcation $L_d$ defined by the decision time $t_{d2}$ and the decision velocity $\omega_{d2}$ is also shown in FIG. 2. The decision point $P_{d2}$ has the coordinates $(t_{d2}, \omega_{d2})$.

The rotor identification arrangement 50 in accordance with the present invention includes a timer 52 for providing a signal on a line 52L representative of elapsed time following initiation of a centrifugation run. Typically the timer 52 is initiated upon energization of the motive source 30.

In accordance with a first general embodiment of the present invention the rotor identification arrangement 50 includes means 54 responsive to the tachometer signal on the line 38L and to the timer signal on the line 52L for generating a signal on a line 54L representative of the actual measured angular velocity $\omega_a$ exhibited by a rotor 18 mounted on the shaft 34 at at least a first predetermined measurement time $t_m$ following initiation of rotation of the rotor 18. A signal representative of the measurement time $t_m$ is applied to the means 54 on a line 58. The predetermined measurement time $t_m$ is selected to correspond to a time when windage effects imposed on the rotor cause the velocity of the rotor on the shaft to differ by a measurable amount from the velocity of each of the others of the plurality of rotors. That is, the measurement time is selected at a point in the centrifugation run where windage effects will be significant and can be used to discern the identity of the rotor.

The signal on the line 54L representative of actual measured angular velocity $\omega_a$ at the measurement time $t_m$ is applied to means generally indicated by the reference character 60. The means 60 is responsive to the signal representative of the actual measured angular velocity $\omega_a$ for generating a rotor identity signal based upon the windage of the rotor 18. In accordance with the present invention the means 60 may take one of several forms.

In a first form the means 60 comprises a look-up table 62. Using the signal on the line 54L as an address the table 62 produces a signal on an output line 64 representative of the identity of the rotor 18 on the shaft 34. The identity signal on the line 64 may serve as the primary rotor identification signal. Alternatively, if the first rotor identification system 42 is provided, the signal on the line 64 may be used as a verification of the rotor identity derived by that means. For example, the identity signal on the line 64 may be compared with the identity signal on the line 44 to determine if an identification mismatch has occurred.

In a second aspect the means 60 may be implemented in the form of a comparator 66. The actual measured angular velocity $\omega_a$ on the line 54L is applied to one side of the comparator 66 while a reference angular velocity value $\omega_{ref}$ corresponding to a known rotor is applied to the comparator 66 over a line 68. The truth of the comparison determines the identity of the rotor 18 which is carried on an output line 70.

This arrangement is also believed to be useful as a verification of the first rotor recognition system 42. The reference angular velocity value $\omega_{ref}$ is derived from the reference table 46 responsive to the identity determined by the first rotor recognition system 42. A true comparison between the actual angular velocity $\omega_a$ and the reference angular velocity $\omega_{ref}$ verifies the identity determination made by the first rotor recognition system 42.

Alternatively the reference angular velocity value $\omega_{ref}$ may be applied to the comparator 66 in accordance with a predetermined sequence, as by stepping through a table of angular velocity values corresponding to particular rotors stored in a suitable table 72.

In accordance with a second general embodiment the rotor identification arrangement 50 includes means 74 also responsive to the tachometer signal on the line 38L and to the timer signal on the line 52L for generating a signal on a line 74L representative of the actual time $t_a$ following initiation of rotation at which the rotor first reaches a predetermined measurement angular velocity $\omega_m$. A signal representative of the measurement velocity $\omega_m$ is applied to the means 74 on a line 76. The predetermined measurement velocity $\omega_m$ is selected to correspond to a velocity when windage effects imposed on the rotor causes the time needed by each of the rotors able to be used on the shaft to differ by a measurable amount from the time required by the others of the plurality of rotors. That is, the measurement velocity is selected at a point in the centrifugation run where windage effects will be significant and can be used to discern the identity of the rotor.

The signal on the line 74L representative of actual measured elapsed time $t_a$ needed to reach the measurement velocity $\omega_m$ is also applied to the means 60. In this instance the means 60 is responsive to the signal representative of the actual measured measured elapsed time $t_a$ for generating a rotor identity signal based upon the windage of the rotor.

The signal on the line 74L may be used as an address to access an identity signal from the table 62. The resultant rotor identity signal is again presented on the line 64. Alternatively the actual measured time $t_a$ is applied to one side of the comparator 66 with a reference time value $t_{ref}$ corresponding to a known rotor being again applied to the comparator 66 over the line 68. The identity of the rotor signal is again presented on the line 70 based on the truth of the comparison effected by the comparator 66. As before the reference time value $t_{ref}$ may be derived from the reference table 46 responsive to the identity determined by the first rotor recognition system 42. The reference time value $t_{ref}$ may also be again applied to the comparator 66 in a predetermined sequence from the table 72.

Reverting to FIG. 2 it may be observed that for a high windage rotor at the measurement time $t_m$, the actual measured velocities are relatively close to each other. This may be observed from the velocities $\omega_{a-3}$ and $\omega_{a-4}$ for the high windage rotor 3 and the high windage rotor 4, respectively. Conversely at the measurement time $t_m$ the respective actual measured velocities for low windage rotors are spaced relatively widely. The velocities $\omega_{a-1}$ and $\omega_{a-2}$ for the low windage rotor 1 and the low windage rotor 2 bear witness to this statement. It may similarly be observed that the actual times $t_{a-1}$ and $t_{a-2}$ required for the low windage rotor 1 and the low windage rotor 2, respectively, to attain the measurement velocity $\omega_m$ re relatively close to each other. However the actual times $t_{a-3}$ and $t_{a-4}$ required for the high windage rotor 3 and the high windage rotor 4, respectively, to reach the measurement velocity $\omega_m$ are spaced more widely apart.

These observations make it clear that a low windage rotor may be more accurately identified using the means 54 which measures the actual speed $\omega_a$ of a rotor at a predetermined measurement time $t_m$. Conversely, for a high windage rotor, more accurate identification may be made using the means 74 to measure the actual time $t_a$ required by the rotor to reach a predetermined measurement speed $\omega_m$.

In accordance with yet another embodiment of the present invention a selector 78 responsive to both the tachometer signal on the line 38L and the timer output on the line 52L utilizes the coordinates ($t_d$, $\omega_d$) of a predetermined decision point $P_d$ on the curve of demarcation $L_d$ to determine whether an unknown rotor 18 on the shaft 34 lies in either the high windage or the low windage regime. Based on the results of this determination either the means 54 or the means 74 is selected. If the actual velocity $\omega_a$ of the rotor on the shaft at the time $t_d$ is greater than the velocity $\omega_d$ the rotor lies in the low windage regime. In this event the output line 78L is asserted. Alternatively, if the actual velocity $\omega_a$ of the rotor on the shaft at the time $t_d$ is less than the velocity $\omega_d$ the rotor lies in the high windage regime. This causes the line 78H to be asserted.

One convenient implementation uses the output on a line 78H (high windage) or 78L (low windage) to assert a switch 80H or 80L thereby to connect the output of either the means 54 or the means 74 to the means 60. In addition, if the means 60 is implemented using the comparator 66 the output of the selector 78 may be used to close a switch 82 which applies either the reference time value $t_{ref}$ or a reference velocity value $\omega_{ref}$ from the table 46 to the line 68 to the comparator 66.

If only one decision point $P_d$ on the curve of demarcation $L_d$ is used it should be judiciously chosen so that a decision as to the regime in which the rotor falls (i.e., low windage or high windage) is made as early as practicable in the centrifugation run. This circumstance permits the identity determination to be made at a time when windage effects are significant yet before a potential safety hazard may develop. The decision point $P_d$ should be selected to properly categorize a low inertia, high windage rotor, which may undergo an initial rapid acceleration due to its relatively low inertia before windage effects become dominant.

It should be understood that if the second decision point $P_{d2}$ on the curve of demarcation $L_d$ is used the slope of the curve of demarcation between the decision points $P_d$ and $P_{d2}$ may serve as a useful indicator of the appropriate regime to which the rotor on the shaft belongs.

Since the present invention relies on windage effects produced by a given rotor to identify the same it may be appreciated that in a practical application the control arrangement 50 should include a calibration scheme to compensate for the effects of atmospheric pressure at the locality where the instrument is being used and to compensate for idiosyncrasies (as in drive torque versus velocity profile, for example) between centrifuge instruments.

To this end means generally indicated by the reference character 86, 88 are respectively connected into the output lines from the means 54 and 74 for scaling the signals on the respective lines 54L, 74L by a predetermined scaling factor. The scaling factor serves to adjust the value of the signal on the line in which it is connected to compensate for any locality and/or individual instrument effects.

In practice the calibration is done using a reference rotor of precisely known windage and having a precisely known velocity versus time profile in a standardized instrument at a standardized pressure (e.g., atmospheric pressure at sea level). The reference rotor is used in the instrument and the compensating means 86, 88 appropriately adjusted to bring the actual signal values on the lines 54L, 74L into predetermined close tolerance with the reference values known to be produced by the reference rotor under the standardized conditions.

As noted earlier each centrifuge rotor usable within a given centrifuge instrument exhibits a predetermined angular velocity versus time profile. FIG. 2 illustrates such hypothetical profiles for each of four rotors. Heretofore the description of the present invention made clear the manner in which a rotor may be identified on the basis of a single point along the profile. However, accuracy of identification may be enhanced if a plurality of points (i.e., two or more points) along the velocity versus time curve are used to identify an unknown rotor.

For example, reference to the velocity versus time curves for the rotor 1 or the rotor 3 as shown in FIG. 2 is invited. In accordance with this further aspect of the present invention the means 54 may be asserted to generate on a line 54L a signal representative of the actual measured angular velocity $\omega_a$ exhibited by a rotor 18 mounted on the shaft 34 at at least a second predetermined measurement time $t_{m2}$ following the first predetermined measurement time $t_m$. In this manner a velocity versus time profile of the unknown rotor may be constructed.

If, for example, the unknown rotor is in fact the rotor 1 the second signal on the line 54L is thus representative of actual measured angular velocity $\omega_{a-1'}$ for that rotor at the measurement time $t_{m2}$. From the profile generated using the information representative of actual measured angular velocities $\omega_{a-1}$ and $\omega_{a-1'}$ at the respective measurement times $t_m$ and $t_{m2}$ it is believed that a more accurate identity signal of the unknown rotor can be generated.

The actual angular velocities $\omega_{a-1}$ and $\omega_{a-1'}$ may be used in a variety of ways to generate the identity signal. For example, each velocity measurement signal $\omega_{a-1}$ and $\omega_{a-1'}$ may be used as an address to the table 62 and a consensus (or unanimity) of identity outputs from the table 62 may be required before an identity signal is presented on the line 64.

Alternatively, a point-by-point comparison may be made using the comparator 66. Each of the actual angular velocities $\omega_{a-1}$ and $\omega_{a-1'}$ is compared to a respective reference velocity $\omega_{ref}$ and $\omega_{ref}$ corresponding to each respective reference time $t_m$ and $t_{m2}$. The reference velocities $\omega_{ref}$ and $\omega_{ref}$ are derived from the table 46 (responsive to the first identification system 42) or from the store 72.

As yet another alternative the set of actual angular velocities may be used to generate the slope of a velocity versus time curve of the unknown rotor. The slope of the curve may be compared to a reference slope (e.g., as derived from the first identification system) or to the slopes of a family of rotors to determine the rotor identity. If more than two actual velocities are measured an equation may be fit to the set of angular velocities. The coefficients of the terms of the equation may be compared to a reference set of coefficients (e.g., as derived from the first identification system or from the coefficients of the equations of a family or rotors stored in the store 72) to determine the rotor identity.

The measurement of each of the angular velocities may be made with reference to zero velocity. However, especially when dealing with a plurality of actual velocities comprising a velocity versus time profile, it is believed more advantageous to use the incremental difference between the angular velocity $\omega_{a-1}$ and the angular velocity $\omega_{a-1'}$ to identify the unknown rotor. The change in velocity over the time increment $t_m$ to $t_{m2}$ (i.e., the acceleration) is thus used to identify the rotor.

If the means 74 is used the signals on the line 74L represent the actual measured elapsed times $t_a$ and $t_{a'}$ needed for the rotor to reach the respective measurement velocities $\omega_m$ and $\omega_{m2}$. In the context of FIG. 2, for the instance of the rotor 3, the elapsed times $t_{a-3}$ and $t_{a-3'}$ and the respective measurement velocities $\omega_m$ and $\omega_{m2}$ are shown. As analogously described immediately above these time signals may be applied to the means 62 or to the comparator 66 (deriving its references from the store 72 or from the table 46). In addition to using the time values on a point by point basis the value of the difference (slope) between the times $t_{a-3}$ and $t_{a-3'}$ may also be applied to the table 62 or to the comparator 66.

It should be understood that the invention as hereinabove described is preferably implemented using a microprocessor based programmable device operating in accordance with a suitable program.

As an example of a possible microprocessor implementation a listing in C source language of a program implementing the present invention is set forth in the Appendix thereto. The subroutine "primary id" performs the functions 54, 74, and the selector function 78. Based on the determination of whether the rotor lies in the low windage or the high windage regime the "low windage loop" or "the high windage loop" implement the functions of the comparator 66 and the store 72.

Although, in general, the invention is believed to find its greatest utility in a nonevacuated centrifuge instrument it should be understood that the present invention may also be used with advantage in a partially evacuated centrifuge instrument. Such an instrument is one that operates at a chamber pressure that is less than atmospheric but still sufficiently high to exert windage effects on a rotor being spun therein.

It should be noted that the various embodiments of the present invention are all set forth on the diagram of FIG. 1 for economy of illustration. A skilled artisan may find it convenient to select only portions of the arrangement as shown in FIG. 1 and still remain within the contemplation of the present invention. For example, any discussed form of the means 60 as shown in FIG. 1 may be used to implement the present invention. In addition the exact time or velocity values defining the points $P_d$, the velocity values $\omega_m$ and $\omega_{m2}$, or the time values $t_m$ and $t_{m2}$, could vary based on the torque output of the motive source. However any appropriate time or angular velocity values may be chosen so long the identity determination can be made when windage is dominant but before a safety hazard develops.

Moreover, those skilled in the art, having the benefits of the teachings of the present invention as hereinabove set forth, may effect numerous modifications thereto. Such modifications are to be construed as lying within the contemplation of the present invention, as defined by the appended claims.

APPENDIX

```
/* This program in C demonstrates the primary rotor windage identification
/* system using the selec

/* Global Variables are as follows: */

int     rotor;              /* rotor id index used to indentify rotor */
int     t_m = 30;           /* measurement time in seconds at which to
                               measure rotor speed */
int     w_m = 128;          /* measurement speed in rpm at which to
                               measure time of run */
int     t;                  /* time index */
int     w;                  /* rotational velocity measured at time t */
int     t_d = 15;           /* decision time to determine which windage loop */
int     w_d = 64;           /* decision speed to determine which windage loop */
int     high_windage_tbl;      /* table containing high windage times for
                                  each rotor */
int     low_windage_tbl;     /* table containing low windage times for
                                each rotor */

/* Low Windage Loop - This loop determines the rotor that most */
/* closely matches the windage at the given minimum time */

int     low_windage_loop()
{

 for ( rotor_id=0; rotor_id< num_rotors_in_table; rotor_id++)
 {
  if (low_windage_tbl[rotor_id]  == w)
      return(rotor_id);                              70        66,
                                                               72
}
/* High  Windage Loop -  This loop determines the rotor that most */
/* closely matches the windage at the given minimum speed */
```

```
int     high_windage_loop()
{

 for ( rotor_id=0; rotor_id< num_rotors_in_table; rotor_id++)
 {
   if (high_windage_tbl[rotor_id]  == t)
        return(rotor_id);

}

/*  This id system will return a rotor given the velocity and time */

int     primary_id()
{
int     total_run_time;         /* total run time of a rotor tracked by t */
int     low_windage_flag=0;     /* this flag selects a low windage rotor */
int     high_windage_flag=0;    /* this flag selects a high windage rotor */

/*   Loop for the entire run and monitor the time of the run */

        while (t <  total_run_time)
                {

                        w = measure_velocity(); /* get velocity at time t */

/* At the decision time, decide whether we have a low windage or */
/*  high windage rotor   */

                if ( t == t_d)
                  {
                   if (w > w_d)
                        low_windage_flag =1;
                   else
                        high_windage_flag =1;

                  }

/*  For low windage rotors, determine the rotor id at the measured time */

                        if ( ( t == t_m ) && ( low_windage_flag) )
                                {
                                        rotor = low_windage_loop();
                                        return(rotor);
                                }

/*  For high windage rotors, determine the rotor id at the measured speed */

                        if (( w == w_m) && (high_windage_flag))
                                {
                                        rotor = high_windage_loop();
                                        return(rotor);
                                }
                t++;

                }       /* end of run */

    }  /* end of primary_id routine */

main()

{

rotor = primary_id();
printf (". The rotor was identified to be id # %i .",rotor);

}
```

What is claimed is:

1. A centrifuge instrument adapted to accept any one of a plurality of rotors in a partially evacuated or nonevacuated chamber thereof, each rotor when within the instrument having a predetermined velocity versus time profile, the instrument comprising:

a motive source having a shaft adapted to receive any one of the plurality of rotors thereon;

first means for generating a signal representative of the actual velocity $\omega_a$ of a rotor disposed on the shaft at at least a first predetermined measurement time $t_m$ following initiation of the rotation of the rotor;

second means for generating a signal representative of the time $t_a$ that a rotor disposed on the shaft first reaches at least a first predetermined measurement velocity $\omega_m$;

third means responsive to the selected one of the velocity signal $\omega_a$ or the time signal $t_a$ for generating a rotor identity signal based upon the windage of the rotor; and a selector for selectively applying the velocity signal $\omega_a$ or the time signal $t_a$ to the third means.

2. The centrifuge instrument of claim 1 wherein the selector applies the selected velocity signal $\omega_a$ or the time signal $t_a$ to the third means in accordance with the relationship between the actual velocity of the rotor as measured at a predetermined time $t_d$ and a predetermined velocity $\omega_d$.

3. The centrifuge instrument of claim 1 wherein the third means for generating a rotor identity signal based upon the windage of the rotor comprises a look-up table.

4. The centrifuge instrument of claim 1 wherein the predetermined measurement velocity $\omega_m$ is selected so that windage effects cause the time required by the rotor on the shaft to reach the measurement velocity $\omega_m$ to differ by a measurable amount from the time required by each of the others of the plurality of rotors to reach the measurement velocity $\omega_m$.

5. The centrifuge instrument of claim 4 wherein the predetermined measurement time $t_m$ is selected to correspond to a time when windage effects cause the velocity of the rotor on the shaft to differ by a measurable amount from the velocity attainable by each of the others of the plurality of rotors at the predetermined measurement time $t_m$.

6. The centrifuge instrument of claim 1 wherein the predetermined measurement time $t_m$ is selected to correspond to a time when windage effects cause the velocity of the rotor on the shaft to differ by a measurable amount from the velocity attainable by each of the others of the plurality of rotors at the predetermined measurement time $t_m$.

7. The centrifuge instrument of claim 1 wherein the third means for generating a rotor identity signal based upon the windage of the rotor comprises a comparator for comparing the velocity signal $\omega_a$ or the time signal $t_a$ to a respective velocity reference signal $\omega_{ref}$ or to a respective time reference signal $t_{ref}$.

8. The centrifuge instrument of claim 7 further comprising a first rotor identification system and wherein the velocity reference signal $\omega_{ref}$ and the time reference signal $t_{ref}$ are derived from the first rotor identification system.

9. A method for identifying which of a plurality of rotors is mounted on a shaft of a centrifuge instrument in a partially evacuated or nonevacuated chamber thereof, each rotor when within the instrument having a predetermined velocity versus time profile, the method comprising the steps of:

(a) accelerating a rotor mounted on the shaft of the instrument to initiate rotation thereof;

(b) generating a first signal representative of the actual velocity $\omega_a$ of a rotor disposed on the shaft at at least a first predetermined measurement time $t_m$ following initiation of rotation of the rotor;

(c) generating a second signal representative of the time $t_a$ that a rotor disposed on the shaft first reaches at least a first predetermined measurement velocity $\omega_m$ following initiation of rotation of the rotor;

(d) electronically selecting the velocity signal $\omega_a$ or the time signal $t_a$; and (e) using the selected one of the velocity signal $\omega_a$ or the time signal $t_a$ to generate a rotor identity signal based upon the windage of the rotor.

10. The method of claim 9 wherein the step (d) includes the steps of:

(d1) measuring the actual velocity of the rotor at a predetermined time $t_d$;

(d2) comparing the measured actual velocity signal at the time $t_d$ to a predetermined velocity $\omega_d$; and (d3) selecting the velocity signal $\omega_a$ or the time signal $t_a$ in accordance with the comparison between the measured actual velocity at a predetermined time $t_d$ and the predetermined velocity $\omega_d$.

11. The method of claim 9 wherein the step (e) comprises using a look-up table to generate the rotor identity signal based upon the windage of the rotor.

12. The method of claim 9 wherein the predetermined measurement velocity $\omega_m$ is selected so that windage effects cause the time required by the rotor on the shaft to reach the measurement velocity $\omega_m$ to differ by a measurable amount from the time required by each of the others of the plurality of rotors to reach the measurement velocity $\omega_m$.

13. The method of claim 12 wherein the predetermined measurement time $t_m$ is selected to correspond to a time when windage effects cause the velocity of the rotor on the shaft to differ by a measurable amount from the velocity attainable by each of the others of the plurality of rotors at the predetermined measurement time $t_m$.

14. The method of claim 9 wherein the predetermined measurement time $t_m$ is selected to correspond to a time when windage effects cause the velocity of the rotor on the shaft to differ by a measurable amount from the velocity attainable by each of the others of the plurality of rotors at the predetermined measurement time $t_m$.

15. The method of claim 9 wherein the step (e) comprises comparing the actual velocity signal $\omega_a$ or the time signal $t_a$ to a respective velocity reference signal $\omega_{ref}$ or to a respective time reference signal $t_{ref}$ to generate the rotor identity signal based upon the windage of the rotor.

16. The method of claim 15 wherein the reference velocity signal $\omega_{ref}$ and the time reference signal $t_{ref}$ are derived from a first rotor identification system.

17. A centrifuge instrument adapted to accept any one of a plurality of rotors in a partially evacuated or nonevacuated chamber thereof, each rotor when within the instrument having a predetermined velocity versus time profile, the instrument comprising:

a motive source having a shaft adapted to receive any one of the plurality of rotors thereon;

means for generating a signal representative of the actual velocity $\omega_a$ and $\omega_{a'}$ of a rotor disposed on the shaft at a respective first predetermined measurement time $t_m$ and a respective second predetermined measurement time $t_{m2}$ following initiation of rotation of the rotor;

means responsive to the signals representative of the velocities $\omega_a$ and $\omega_{a'}$ for generating a rotor identity signal based upon the windage of the rotor.

18. The centrifuge instrument of claim 17 wherein the means for generating a rotor identity signal based upon the windage of the rotor comprises a look-up table.

19. The centrifuge instrument of claim 17 wherein the means for generating a rotor identity signal based upon the windage of the rotor is responsive to the difference between the actual velocity signals $\omega_a$ and $\omega_{a'}$.

20. The centrifuge instrument of claim 17 wherein the predetermined measurement times $t_m$ and $t_{m2}$ are selected to correspond to times when windage effects cause the velocity of the rotor on the shaft to differ by a measurable amount from the velocity attainable by each of the others of the plurality of rotors at the predetermined measurement times $t_m$ and $t_{m2}$.

21. The centrifuge instrument of claim 17 wherein the means for generating a rotor identity signal based upon the windage of the rotor comprises a comparator for comparing the actual velocity signals $\omega_a$ and $\omega_{a'}$ to respective velocity reference signals $\omega_{ref}$ and $\omega_{ref}$.

22. The centrifuge instrument of claim 21 further comprising a first rotor identification system and wherein the reference velocity signals $\omega_{ref}$ and $\omega_{ref}$ are derived from the first rotor identification system.

23. A centrifuge instrument adapted to accept any one of a plurality of rotors in a partially evacuated or nonevacuated chamber thereof, each rotor when within the instrument having a predetermined velocity versus time profile, the instrument comprising:

a motive source having a shaft adapted to receive any one of the plurality of rotors thereon;

first means for generating a signal representative of the actual velocity $\omega_a$ and $\omega_{a'}$ of a rotor disposed on the shaft at a respective first predetermined measurement time $t_m$ and a respective second predetermined measurement time $t_{m2}$ following initiation of rotation of the rotor;

means for generating a signal representative of the times $t_a$ and $t_{a'}$ that a rotor disposed on the shaft first reaches a respective first predetermined measurement velocity $\omega_m$ and a respective second predetermined measurement velocity $\omega_{m2}$;

third means responsive to the selected velocity signals or time signals for generating a rotor identity signal based upon the windage of the rotor; and a selector for selectively applying the velocity signals or the time signals to the third means.

24. The centrifuge instrument of claim 23 wherein the selector applies the selected velocity signals or time signals in accordance with the relationship between the actual velocity of the rotor at a predetermined time $t_d$ and a predetermined velocity $\omega_d$ and between the actual velocity of the rotor at a second predetermined time $t_{d2}$ and a predetermined velocity $\omega_{d2}$.

25. The centrifuge instrument of claim 23 wherein the selector applies the selected velocity signals or time signals in accordance with the change in the actual velocity of the rotor between a predetermined time $t_d$ and a second predetermined time $t_{d2}$ with respect to a change between a predetermined velocity $\omega_d$ and a second predetermined velocity $\omega_{d2}$.

26. The centrifuge instrument of claim 23 wherein the third means for generating a rotor identity signal based upon the windage of the rotor comprises a look-up table.

27. The centrifuge instrument of claim 23 wherein the third means for generating a rotor identity signal based upon the windage of the rotor is responsive to the difference between the actual velocity signals $\omega_a$ and $\omega_{a'}$.

28. The centrifuge instrument of claim 23 wherein the predetermined measurement velocities $\omega_m$ and $\omega_{m2}$ are selected so that windage effects cause the times required by the rotor on the shaft to reach the measurement velocities $\omega_m$ and $\omega_{m2}$ to differ by a measurable amount from the times required by each of the others of the plurality of rotors to reach the measurement velocities $\omega_m$ and $\omega_{m2}$.

29. The centrifuge instrument of claim 28 wherein the predetermined measurement times $t_m$ and $t_{m2}$ are selected to correspond to times when windage effects cause the velocity of the rotor on the shaft to differ by measurable amounts from the velocity attainable by each of the others of the plurality of rotors at the predetermined measurement times $t_m$ and $t_{m2}$.

30. The centrifuge instrument of claim 23 wherein the predetermined measurement times $t_m$ and $t_{m'}$ are selected to correspond to times when windage effects imposed on the rotor cause the velocity of the rotor on the shaft to differ by measurable amounts from the velocity attainable by each of the others of the plurality of rotors the predetermined measurement times $t_m$ and $t_{m2}$.

31. The centrifuge instrument of claim 23 wherein the third means for generating a rotor identity signal based upon the windage of the rotor comprises a comparator for comparing the actual velocity signals $\omega_a$ and $\omega_{a'}$ or the time signals $t_a$ and $t_{a'}$ to respective velocity reference signal $\omega_{ref}$ and $\omega_{ref}$ or to respective time reference signals $t_{ref}$ and $t_{ref}$.

32. The centrifuge instrument of claim 31 further comprising a first rotor identification system and wherein the reference velocity signals $\omega_{ref}$ and $\omega_{ref}$ and the time reference signals $t_{ref}$ and $t_{ref}$ are derived from the first rotor identification system.

33. A method for identifying which of a plurality of rotors is mounted on a shaft of a centrifuge instrument in a partially evacuated or nonevacuated chamber thereof, each rotor when within the instrument having a predetermined velocity versus time profile, the method comprising the steps of:

(a) accelerating a rotor mounted on the shaft of the instrument to initiate rotation thereof;

(b) generating a signal representative of the actual velocity $\omega_a$ and $\omega_{a'}$ of a rotor disposed on the shaft at a respective first predetermined measurement time $t_m$ and a respective second predetermined measurement time $t_{m2}$ following initiation of rotation of the rotor;

(c) in response to the signals representative of the velocities $\omega_a$ and $\omega_{a'}$ generating a rotor identity signal based upon the windage of the rotor.

34. The method of claim 33 wherein the step (c) comprises using a look-up table to generate the rotor identity signal based upon the windage of the rotor.

35. The method of claim 33 wherein the step (c) comprises generating the rotor identity signal in accordance with the difference between the actual velocity signals $\omega_a$ and $\omega_{a'}$.

36. The method of claim 35 wherein the predetermined measurement times $t_m$ and $t_{m2}$ are selected to correspond to times when windage effects cause the velocity of the rotor on the shaft to differ by a measurable amount from the velocity attainable by each of the others of the plurality of rotors at the predetermined measurement times $t_m$ and $t_{m2}$.

37. The method of claim 33 wherein the step (c) comprises comparing the actual velocity signals $\omega_a$ and $\omega_{a'}$ to respective velocity reference signals $\omega_{ref}$ and $\omega_{ref}$ to generate the rotor identity signal based upon the windage of the rotor.

38. The method of claim 37 wherein the velocity reference signals $\omega_{ref}$ and $\omega_{ref}$ are derived from a first rotor identification system.

39. A method for identifying which of a plurality of rotors is mounted on a shaft of a centrifuge instrument in a partially evacuated or nonevacuated chamber thereof, each rotor when within the instrument having a predetermined velocity versus time profile, the method comprising the steps of:

(a) accelerating a rotor mounted on the shaft of the instrument to initiate rotation thereof;

(b) generating first signals representative of the actual velocity $\omega_a$ and $\omega_{a'}$ of a rotor disposed on the shaft at a respective first predetermined measurement time $t_m$ and a respective second predetermined measurement time $t_{m2}$ following initiation of rotation of the rotor;

(c) generating second signals representative of the times $t_a$ and $t_{a'}$ that a rotor disposed on the shaft first reaches a respective first predetermined measurement velocity $\omega_m$ and a respective second predetermined measurement velocity $\omega_{m2}$ following initiation of rotation of the rotor;

(d) electronically selecting the velocity signals or the time signals; and (e) using the selected velocity signals $\omega_a$ and $\omega_{a'}$ or the time signals $t_a$ and $t_{a'}$ to generate a rotor identity signal based upon the windage of the rotor.

40. The method of claim 39 wherein the step (D) includes the steps of:

(d1) measuring the actual velocity of the rotor at a predetermined time $t_d$ and at a second predetermined time $t_{d2}$;

(d2) comparing the measured actual velocity at the predetermined time $t_d$ to a predetermined velocity $\omega_d$;

(d3) comparing the measured actual velocity at the predetermined time $t_{d2}$ to a predetermined velocity $\omega_{d2}$; and (d4) selecting the velocity signals or the time signals in accordance with the comparison between the measured actual velocity at the predetermined time $t_d$ and the predetermined velocity $\omega_d$ and between the actual measured actual velocity at the predetermined time $t_{d2}$ and the predetermined velocity $\omega_{d2}$.

41. The method of claim 39 wherein the step (d) includes the steps of:

(d1) measuring the actual velocity of the rotor at a predetermined time $t_d$ and at a second predetermined time $t_{d2}$;

(d2) determining the change in the measured actual velocity between the predetermined time $t_d$ and the predetermined time $t_{d2}$;

(d3) determining the change between the predetermined velocity $\omega_d$ corresponding to the predetermined time $t_d$ and the predetermined velocity $\omega_{d2}$ corresponding to the predetermined time $t_{d2}$;

(d4) selecting the velocity signals or the time signals in accordance with a comparison between the change in measured actual velocities and the change in predetermined velocities.

42. The method of claim 39 wherein the step (e) comprises using the velocity signals $\omega_a$ and $\omega_{a'}$ or the time signals $t_a$ and $t_{a'}$ to address a look-up table to generate the rotor identity signal based in the windage of the rotor.

43. The method of claim 39 wherein the step (e) comprises generating the rotor identity signal in accordance with the difference between the actual velocity signals $\omega_a$ and $\omega_{a'}$.

44. The method of claim 39 wherein the step (c) comprises generating the rotor identity signal in accordance with the difference between the actual time signals $t_a$ and $t_{a'}$.

45. The method of claim 39 wherein the predetermined measurement velocities $\omega_m$ and $\omega_{m2}$ are selected so that windage effects cause the times required by the rotor on the shaft to reach the measurement velocities $\omega_m$ and $\omega_{m2}$ to differ by a measurable amount from the times required by each of the others of the plurality of rotors to reach the measurement velocities $\omega_m$ and $\omega_{m'}$.

46. The method of claim 45 wherein the predetermined measurement times $t_m$ and $t_{m2}$ are selected to correspond to times when windage effects imposed on the rotor cause the velocity of the rotor on the shaft to differ by measurable amounts from the velocity attainable by each of the others of the plurality of rotors at the predetermined measurement times $t_m$ and $t_{m2}$.

47. The method of claim 39 wherein the predetermined measurement times $t_m$ and $t_{m2}$ are selected to correspond to times when windage effects imposed on the rotor cause the velocity of the rotor on the shaft to differ by measurable amounts from the velocity attainable by each of the others of the plurality of rotors at the predetermined measurement times $t_m$ and $t_{m2}$.

48. The method of claim 39 wherein the step (e) comprises comparing the actual velocity signals $\omega_a$ and $\omega_{a'}$ or the time signals $t_a$ and $t_{a'}$ to respective velocity reference signals $\omega_{ref}$ and $\omega_{ref}$ or respective time reference signals $t_{ref}$ and $t_{ref}$ to generate the rotor identity signal based in the windage of the rotor.

49. The method of claim 39 wherein the respective velocity reference signals $\omega_{ref}$ and $\omega_{ref}$ and the respective time reference signals $t_{ref}$ and $t_{ref}$ are derived from a first rotor identification system.

* * * * *